United States Patent
Hwang et al.

(10) Patent No.: US 8,862,128 B2
(45) Date of Patent: Oct. 14, 2014

(54) INTEGRATED TERMINAL USING SUPPLEMENTARY INFORMATION AND COMMUNICATING METHOD THEREOF

(75) Inventors: Hyungu Hwang, Daejeon (KR); Daeho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 313 days.

(21) Appl. No.: 13/230,946

(22) Filed: Sep. 13, 2011

(65) Prior Publication Data

US 2012/0064890 A1 Mar. 15, 2012

(30) Foreign Application Priority Data

Sep. 13, 2010 (KR) ........................ 10-2010-0089615

(51) Int. Cl.
*H04W 4/00* (2009.01)
*H04M 3/00* (2006.01)
*H04W 48/16* (2009.01)
*H04W 48/14* (2009.01)
*H04W 8/24* (2009.01)

(52) U.S. Cl.
CPC .............. *H04W 4/001* (2013.01); *H04W 48/16* (2013.01); *H04W 48/14* (2013.01); *H04W 8/245* (2013.01)
USPC ......................................... 455/434; 455/418

(58) Field of Classification Search
CPC ..... H04W 48/14; H04W 48/48; H04W 48/16; H04W 4/001; H04W 8/245
USPC .............. 455/441, 552.1, 434, 418; 370/328
See application file for complete search history.

(56) References Cited

U.S. PATENT DOCUMENTS

| | | | |
|---|---|---|---|
| 2005/0105491 A1* | 5/2005 | Chaskar et al. | 370/331 |
| 2006/0002340 A1* | 1/2006 | Criss et al. | 370/328 |
| 2008/0170530 A1* | 7/2008 | Connors et al. | 370/312 |
| 2008/0171515 A1* | 7/2008 | Kim et al. | 455/63.1 |
| 2008/0182616 A1* | 7/2008 | Connors et al. | 455/552.1 |
| 2008/0311848 A1* | 12/2008 | Proctor et al. | 455/9 |
| 2010/0075671 A1* | 3/2010 | Kubo | 455/434 |
| 2011/0201291 A1* | 8/2011 | Suzuki et al. | 455/226.2 |

FOREIGN PATENT DOCUMENTS

| | | |
|---|---|---|
| KR | 10-0287333 | 4/2001 |
| KR | 1020070061163 | 6/2007 |
| KR | 1020080076522 | 8/2008 |
| KR | 1020090066199 | 6/2009 |
| KR | 10-2010-0006132 | 1/2010 |
| WO | WO 2010024314 A1 * | 3/2010 |

* cited by examiner

*Primary Examiner* — Opiribo Georgewill
(74) *Attorney, Agent, or Firm* — Nelson Mullins Riley & Scarborough LLP; Anthony A. Laurentano, Esq.; Dipti Ramnarain, Esq.

(57) ABSTRACT

Provided is a method for efficiently performing a communication operation using supplementary information. A communication method in an integrated terminal which communicates through communication modems corresponding to base stations of various communication systems includes reading a communication network information file which is updated and is included in the integrated terminal and performing the communication operation based on the read communication network information file.

13 Claims, 9 Drawing Sheets

INTEGRATED TERMINAL USING SUPPLEMENTARY INFORMATION AND COMMUNICATING METHOD THEREOF

CROSS-REFERENCE TO RELATED APPLICATIONS

This U.S. non-provisional patent application claims priority under 35 U.S.C. §119 to Korean Patent Application No. 10-2010-0089615, filed on Sep. 13, 2010, the entire contents of which are hereby incorporated by reference.

BACKGROUND OF THE INVENTION

The present invention disclosed herein relates to a communication system, and more particularly, to an integrated terminal capable of efficiently performing communication operations using supplementary information and a communication method thereof.

Generally, most of communication systems are independently operated. That is, a communication system is rarely interoperated with another communication system or a related system. For instance, a navigation device performs an operation for finding its location using information of a GPS receiver, and a mobile communication terminal just performs a communication operation contacting with a base station. That is, the two communication systems are operated independently without interoperations between them.

SUMMARY OF THE INVENTION

The present invention provides a method for efficiently performing a communication operation using supplementary information obtained through various paths.

The present invention also provides an improved method for appropriately using supplementary information for efficient communication in a terminal or a base station.

The present invention also provides an improved method for obtaining new supplementary information for efficient communication in a terminal or a base station.

The present invention also provides a method for structuring supplementary information for efficient communication as a file and for applying the file.

The present invention also provides an integrated terminal capable of efficiently performing communication operations using supplementary information and a communication method thereof.

Embodiments of the present invention provide methods for performing a communication operation in a wireless communication terminal including reading a communication network information file including information related to performing the communication operation, wherein the communication network information file is updated and is included in the wireless communication terminal; and performing the communication operation using the read communication network information file.

In some embodiments, the communication network information file may include at least one data from location information of a base station, time information of the base station, transmission power of a reference signal, base station ID, kind of an accessible communication, frequency band, the number of frequency bands, system version of the base station, kind of the base station, information of a region where the base station is included, average coverage of the base station, current state of the base station, paging group, the number of available antennas for transmitting and receiving, average number of accessing users, kind of an accessible terminal, and a possessed repeater.

In other embodiments, the update of the communication network information file may include providing version information of the communication network information file included in the wireless communication terminal to a base station; and receiving a latest version of the communication network information file and updating the file when it is confirmed that the communication network information file is not the latest version in the base station.

In still other embodiments, additional inclusion and update of the communication network information file may include downloading a communication network information file of a selected region through a communication network to which the wireless communication network is currently accessing in response to a region selection request of a user.

In even other embodiments, during an initial signal search for the communication operation, the wireless communication terminal may perform obtaining location information of the wireless communication terminal; selecting at least one nearest base station from the obtained location using base station location information included in the communication network information file; calculating a signal propagation time using a straight-line distance from a nearest base station among the selected base stations and a speed of an electromagnetic wave; setting the calculated signal propagation time as a starting time of an initial signal search time window; and performing the initial signal search within the initial signal search time window.

In yet other embodiments, a reference signal used for a signal demodulation may be used for the performing the initial signal search.

In further embodiments, the wireless communication terminal may measure a reception power of a base station signal and calculate a path loss using the reception power and a base station transmission power included in the communication network information file for calculating the path loss of a downlink signal.

In still further embodiments, in the case that the wireless communication terminal transmits an initial access signal to a base station for an initial access to the base station, the wireless communication terminal may perform obtaining location information of the wireless communication terminal; calculating a straight-line distance between the location of the wireless communication terminal and a base station desired to be accessed using the obtained location supplementary information and base station location information included in the communication network information file; calculating a signal propagation time from the terminal to the base station using the straight-line distance to the base station and a speed of an electromagnetic wave; and transmitting the initial access signal as much as the calculated signal propagation time in advance to be synchronized with an access reception time set by the base station.

In even further embodiments, when a handover time is determined, the wireless communication terminal may perform detecting a signal power of an accessed base station and a signal power of a handover-targeted base station; comparing the detected powers; and performing the handover more rapidly when the signal power of the handover-targeted base station is larger than that of the accessed base station and the wireless communication terminal moves.

In yet further embodiments, when the wireless communication terminal accesses a communication network, the wireless communication terminal may perform obtaining location information of the wireless communication terminal; searching a base station communicable from the obtained location;

and not performing an initial signal search and an initial access try when it is determined that there is no communicable base station based on the searching.

In much further embodiments, when a Doppler frequency offset is calculated, the wireless communication terminal may perform obtaining location information and speed information of the wireless communication terminal; calculating a speed of the wireless communication terminal becoming close to a base station or becoming far from the base station using the obtained location information and speed information and base station location information included in the communication network information file; and calculating the Doppler frequency offset based on the calculated speed.

In still much further embodiments, when a transmission frequency is transmitted, the wireless communication terminal may perform converting the calculated Doppler frequency offset of a downlink to a Doppler frequency offset experienced by a base station in an uplink; and previously compensating an uplink transmission frequency as much as the converted offset value for transmission.

In other embodiments of the present invention, methods for performing a communication operation in an integrated terminal comprising a plurality of communication modems include obtaining supplementary information from a communication network to which the integrated terminal is accessing; and performing the communication operation with another communication network using the obtained supplementary information.

In still other embodiments of the present invention, methods for performing a communication operation in a wireless communication base station include wirelessly receiving terminal supplementary information from an integrated terminal which is accessing a communication network of the base station, wherein the terminal supplementary information is gained by the integrated terminal from another communication network; and performing the communication operation using the received terminal supplementary information.

In some embodiments, when terminal distribution information is obtained, the base station may receive location supplementary information from each integrated terminal and generate location distribution information of integrated terminals.

In other embodiments, when the base station allots resources, the base station may perform receiving location or speed supplementary information of an integrated terminal which is accessing the base station; and allotting more resources as the received location of the terminal is close to the base station or as the received speed of the terminal is low and allotting less resources as the received location of the terminal is far from the base station or as the received speed of the terminal is high.

In even other embodiments of the present invention, methods for performing a communication operation in a wireless communication base station include wirelessly receiving a terminal information file from a terminal which is accessing a communication network of the base station; and performing the communication operation using the received terminal information file.

In some embodiments, the terminal information file may include at least one data from kind of a communication available for a terminal, maximum transmission power, terminal ID, frequency band, the number of frequency bands, system version of a terminal, kind of a terminal, terminal user information (nationality, age, and the like), the number of available antennas for transmitting and receiving, kind of an accessible communication network, kind of a service required to be provided from a communication network, resolution of a terminal LCD, format of a decodable video, camera, GPS receiver, projector, and a peripheral device.

In other embodiments, when the base station allots resources, the base station may calculate distances from each terminal to accessed base stations based on location supplementary information of terminals, allot resources overlapped with resources allotted by another base station as the calculated distance is smaller, and allot not overlapping resources as the distance is large.

In yet other embodiments of the present invention, wireless communication terminals include a plurality of modems configured to perform a communication operation corresponding to base stations of various communication systems; a storage unit configured to store a communication network information file which is self-contained and updated; and a control unit configured to perform the communication operation reading the communication network information file of the storage unit.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the specification, when it is commented that some devices or lines are connected to a target block, the connection includes not only a direct connection but also an indirect connection through another device.

Also, like reference numerals refer to like elements throughout. In some drawings, connections between devices and lines are illustrated just for efficiently explaining technical contents, and thus, other devices or blocks may be further included.

The embodiments exemplified and described in this disclosure may include their complementary embodiments. It should be noted that typical communication processes between a mobile communication system and a mobile communication terminal are omitted so as not to obscure the present invention.

Figure 8:
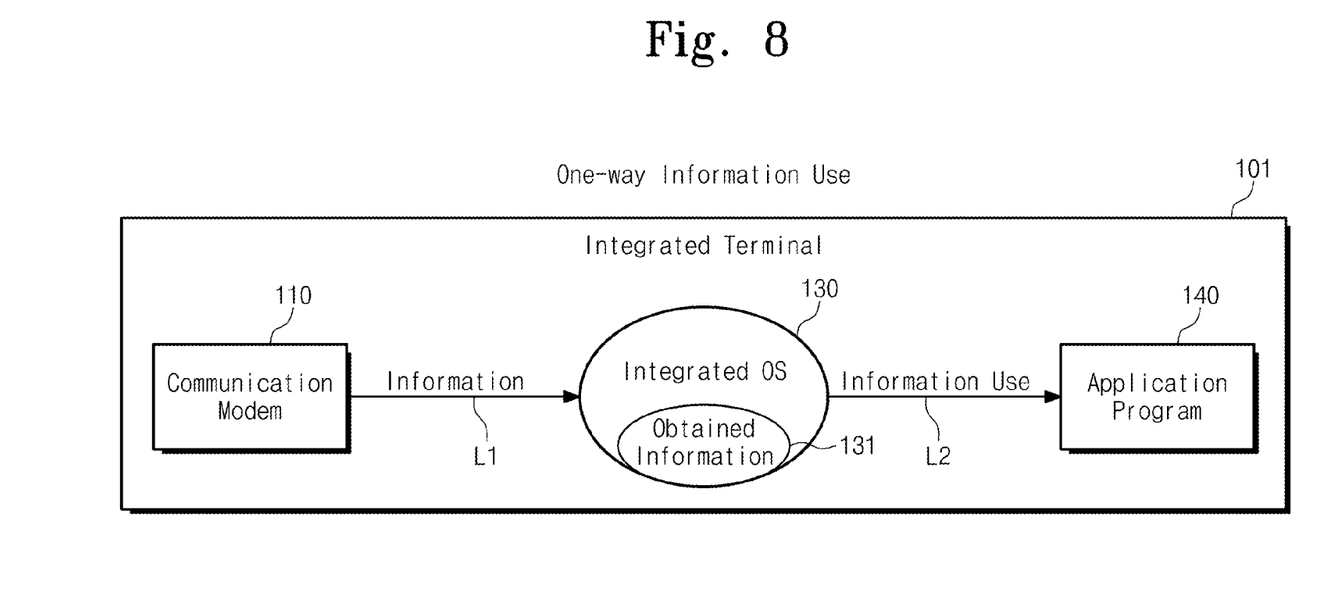
FIG. 8 is a schematic block diagram illustrating a general integrated terminal using one-way information.
Figure 9:
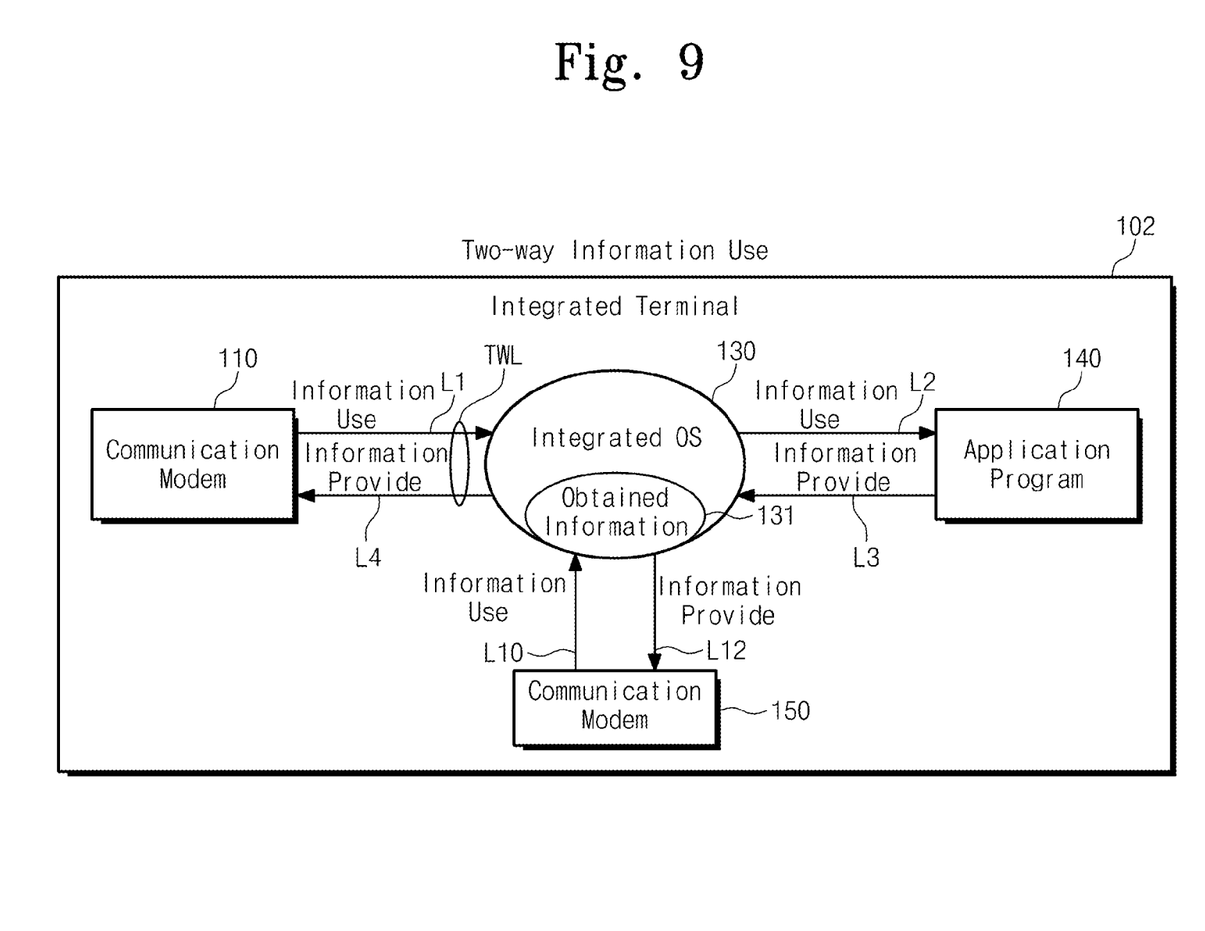
FIG. 9 is a schematic block diagram illustrating an integrated terminal using two-way information to which the present invention is applicable.

Firstly, it may be preferable to apply the embodiment of the present invention to a terminal structure of FIG. 9 than that of FIG. 8. The terminal of FIG. 9 is an up-to-date wireless communication terminal (also referred to as an integrated terminal) using two-way information. The terminal of FIG. 9 may have structural blocks illustrated in FIG. 3.

Figure 2:
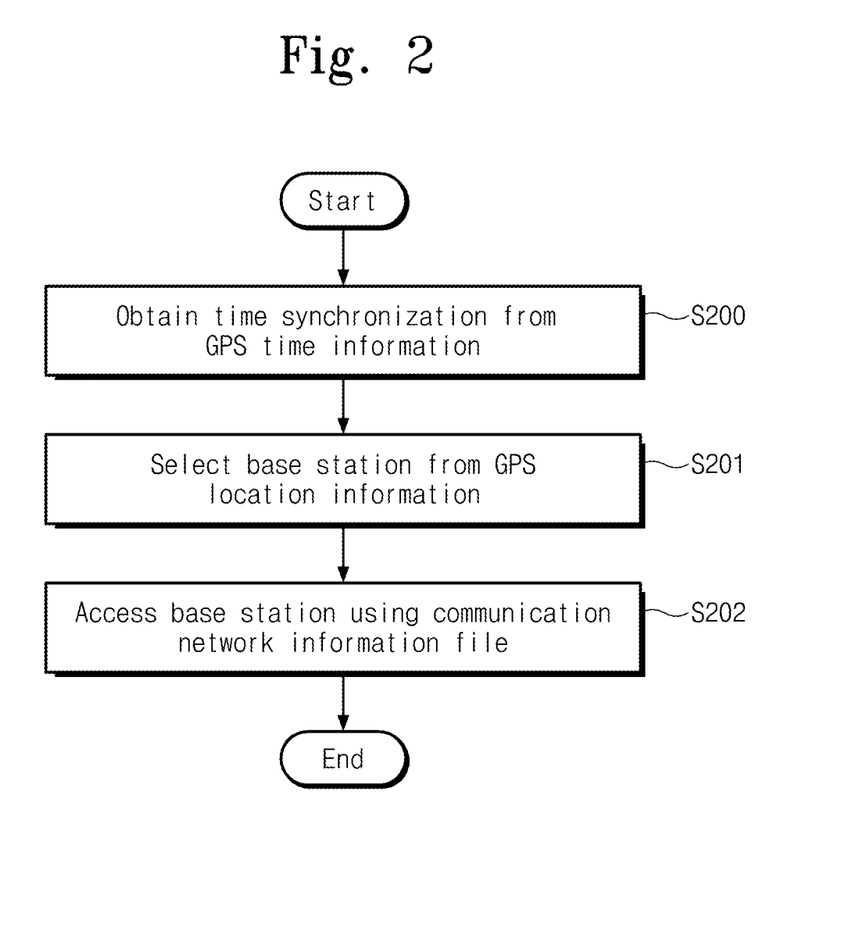
FIG. 2 is a flowchart illustrating a process for a terminal to access a base station according to an embodiment of the present invention.
Figure 5:
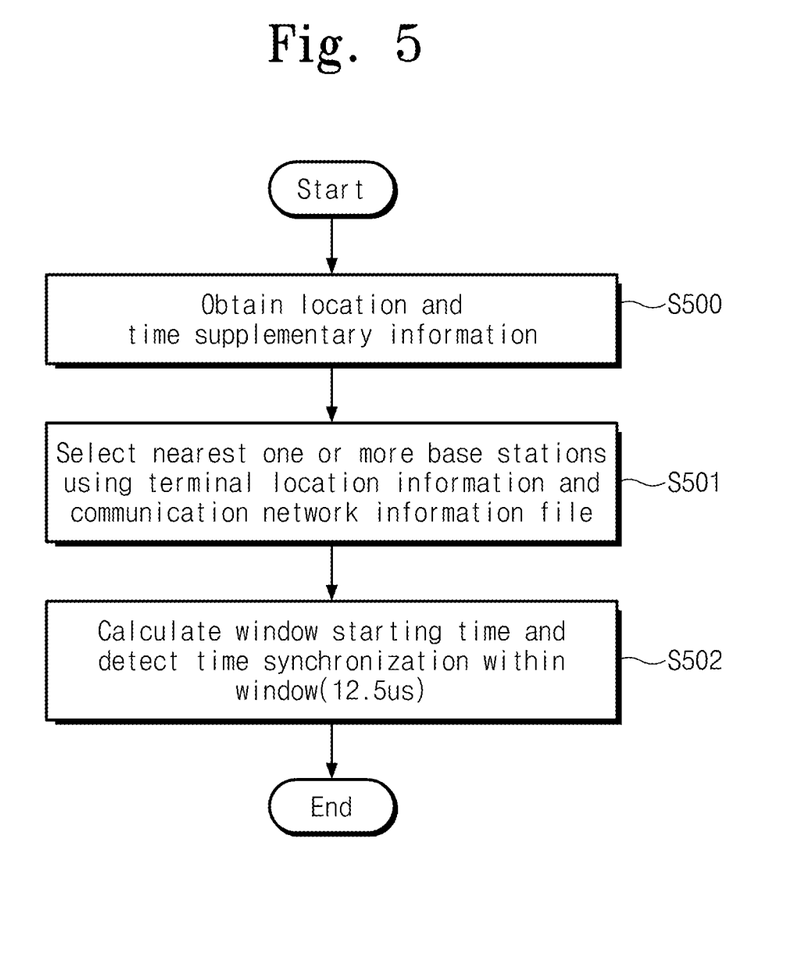
FIG. 5 is a flowchart illustrating improvement of the process of FIG. 5 according to the embodiment of the present invention.

In the embodiment of the present invention, access to a base station is performed in a process illustrated in FIG. 2 using supplementary information and initial time synchronization is detected as illustrated in FIG. 5 during an initial signal search. Therefore, a connection to the base station is fast and simplified, and the search for an initial signal is more efficient. As a result, a communication is more efficiently performed by using the supplementary information.

FIG. 8 is a schematic block diagram illustrating a general integrated terminal using one-way information. An integrated terminal 101 of FIG. 8 which uses one-way information according to a conventional technology includes a communication modem 110 for receiving a communication signal, an integrated Operating System (OS) 130, and an application program 140. Herein, the integrated OS 130 includes a storage unit 131 for storing information gained from the communication modem 110 as obtained information. The integrated terminal 101 of FIG. 8 may have substantially the same structure as that of an integrated terminal 100 of FIG. 3 or may have blocks of added or reduced functions.

In FIG. 8, information outputted from the communication modem 110 is applied to the integrated OS 130. Information to be used when the application program 140 is operated outputted from the integrated OS 130. Such the integrated terminal of FIG. 8 which performs information use in a single direction and is not interoperated with another communication system may have difficulty performing communication efficiently. For instance, in the case of a terminal which determines a location depending on a Global Positioning System (GPS) modem, if a GPS signal is not received, the determination of location information may be difficult because the communication modem 110 cannot receive the GPS signal.

Meanwhile, FIG. 9 is a schematic block diagram illustrating an integrated terminal using two-way information to which the present invention is applicable. Referring to FIG. 9, an integrated terminal 102 includes a first communication modem 110, a second communication modem 150 for communicating with a mobile communication system, an integrated OS 130, and an application program 140. Herein, the integrated OS 130 includes a storage unit 131 for storing supplementary information gained from the first and second communication modems 110 and 150 as obtained information. The integrated terminal 102 of FIG. 9 may have substantially the same structure as that of the integrated terminal 100 of FIG. 3 or may have blocks of added or reduced functions.

In FIG. 9, information outputted from the first communication modem 110 is applied to the integrated OS 130 through a line L1, and information outputted from the integrated OS 130 is provided to the first communication modem 110 through a line L4. Also, information outputted from the integrated OS 130 is applied to the application program 140 through a line L2, and information outputted from the application program 140 is provided to the integrated OS 130 through a line L3. And, information outputted from the second communication modem 150 is applied to the integrated OS 130 through a line L10, and information outputted from the integrated OS 130 is provided to the second communication modem 150 through a line L12. In the drawing, TWL denotes a pair of two-way lines.

In the case of the integrated terminal 102 of FIG. 9 which performs information use in both directions and is interoperated with another communication system, even though the integrated terminal 102 is positioned at a GPS signal shadow area where the integrated terminal 102 is unable to receive the GPS signal, the integrated terminal 102 may obtain supplementary information by communicating with a base station of a mobile communication system or by using the communication modem 150 which performs Wi-Fi functions so that the location information decision may be more efficiently and correctly performed.

Figure 3:
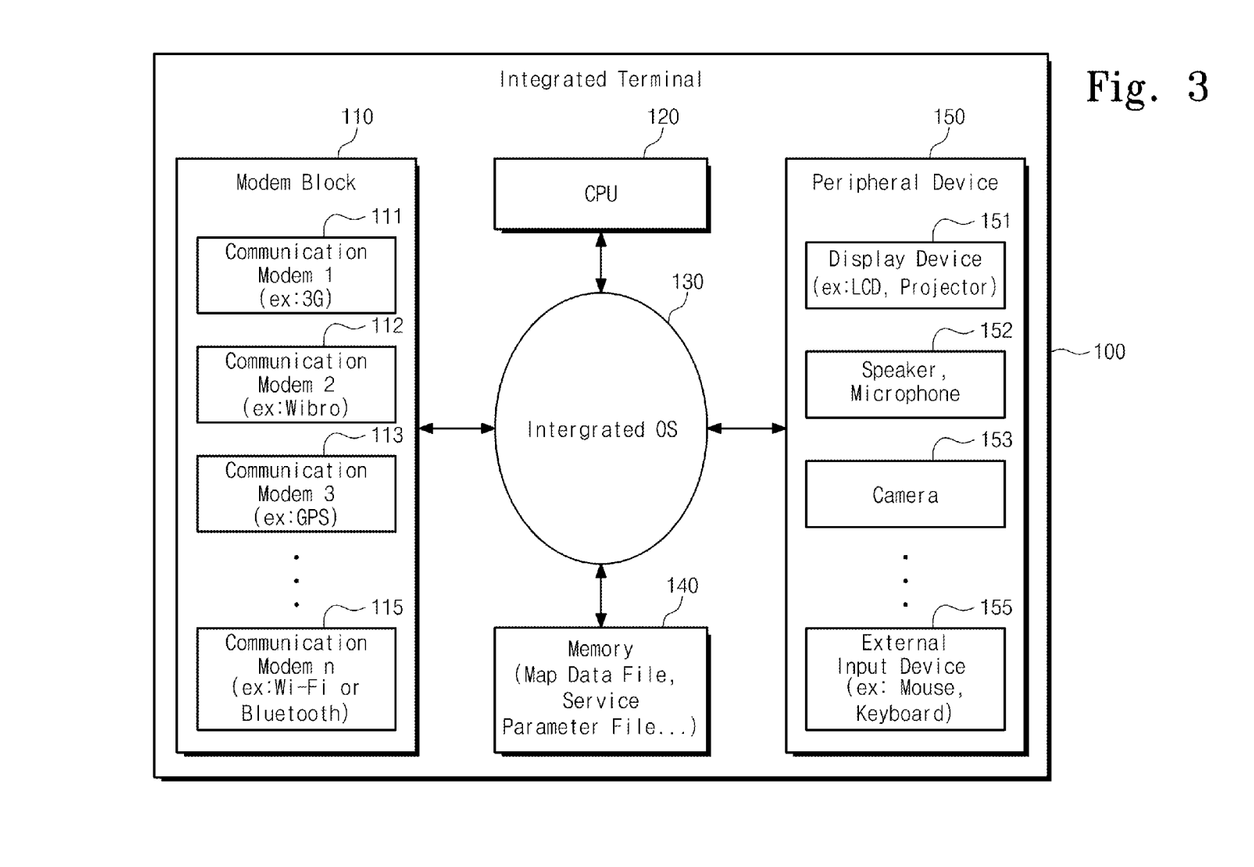
FIG. 3 is a block diagram illustrating an integrated terminal to which the present invention is applicable.

FIG. 3 is referred to for describing a structure of the integrated terminal 102 of FIG. 9 in detail.

FIG. 3 is a block diagram illustrating an integrated terminal to which the present invention is applied. Referring to FIG. 3, an integrated terminal 100 includes a modem block 110, a Central Processing Unit (CPU) 120, an integrated OS 130, a memory 140, and a peripheral device 150.

For implementing functions of the integrated terminal, the modem block 110 may include a first communication modem 111 for 3G communication, a second communication modem 112 for WiBro communication, a third communication modem 113 for GPS communication, and nth communication modem 115 for Wi-Fi or Bluetooth communication.

The CPU 120 performs various processes according to various application programs based on the integrated OS 130. The integrated OS 130 may be, e.g., a Windows-based OS or an Android OS of Google.

The peripheral device 150 may include a display device 151 such as an LCD or projector, speaker and microphone 152, a camera 153, and an external input device 155 such as a mouse or a keyboard.

Since the integrated mobile communication terminal illustrated in FIG. 3 may be actually implemented considering recent technology trends, it is called the integrated terminal in the specification. As a result, the integrated terminal where communication functions such as Bluetooth, Wi-Fi, WiBro, 3G-LTE, and GPS are integrated may be a recently well-known smart phone.

Various smart phones spotlighted in a recent cell phone market include various functions supporting from MP3 and Internet to virtual reality and social network. For instance, the smart phone may be a smart phone called HD2, Omnia2 (SKT), Layla (KT), or Oz-Omnia (LGT) adopting the Windows-based OS, or a smart phone called iPhone, Galaxy S, Galaxy A, Sirius Alpha, Motoglam, X10, MOTO QRTY, Optimus Z, Sirius, Motoroi, Desire, Nexus One, Andro-1, Izar, or Optimus Q adopting the Android-based OS.

In the case of a product such as iPhone, it accesses a 3G communication network or Wi-Fi network. Also, since GPS is internally installed, various applications may be run. In the case of such an integrated terminal, supplementary information may be obtained from various communication systems or peripheral devices.

The supplementary information may include location information using GPS, weather information, map data information, communication system information, and second information reprocessing those kinds of information.

A method for efficiently operating a communication system using the supplementary information will be described.

Figure 1:
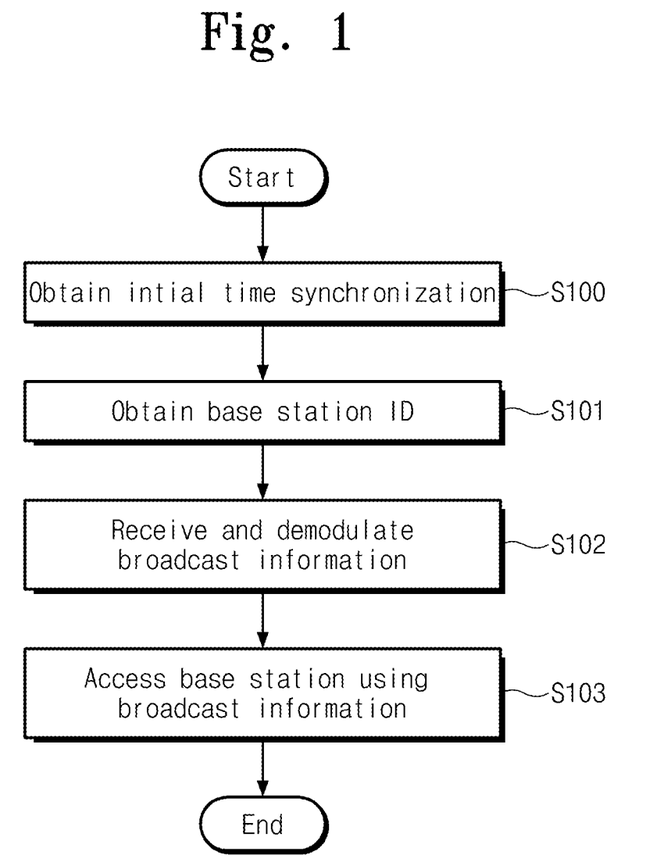
FIG. 1 is a flowchart illustrating a typical process for a terminal of a communication system to access a base station.

In a general communication system, a terminal searches and obtains information transferred from a base station and accesses the base station of the communication system based on the obtained information. For instance, as illustrated in FIG. 1, a terminal obtains initial time synchronization for a base station in an international standard 3G-LTE system in operation S100, obtains a base station ID in operation S101, and receives and demodulates a BCH signal which is broadcast information transferred from the base station in operation S102. Thereafter, the terminal accesses a corresponding base station using the demodulated system information, i.e., the broadcast information. Such initial processes of obtaining the initial time information, selecting a near base station ID, and obtaining the broadcast information for an initial access make the initial access complicated and take a relatively long time.

Simplification of the initial access is one of the most important factors for maximizing a communication service in a mobile communication system evolving to a packet system.

In the embodiment of the present invention, the initial access is simplified as illustrated in FIG. 2 using the merit of integrating various communication functions such as Bluetooth, Wi-Fi, WiBro, 3G-LTE, and GPS into a single terminal. In the case of a packet communication, even though a communication is interrupted, the communication may be resumed anytime unlike a circuit communication which always maintains a communication state. In this case, it is needed to more simplify a process of initial access or re-access.

FIG. 2 is a flowchart illustrating a process of simplifying the initial access using supplementary information according to the embodiment of the present invention.

Referring to FIG. 2, since the integrated terminal 100 of FIG. 3 may include the first communication modem 111 for 3G communication, the second communication modem 112 for WiBro communication, the third communication modem 113 for GPS communication, and nth communication modem 115 for Wi-Fi or Bluetooth communication in the modem block 110, various supplementary information may be obtained through corresponding modems.

For instance, in the case of obtaining time information and location information as the supplementary information by using the third communication modem 113, the integrated terminal may obtain time synchronization using the supplementary information in operation S200 and may select at least one of a plurality of base stations from a self-contained communication network information file in operation S201. And, access information related to the selected base station is found using the communication network information file and the selected base station is accessed using the access information in operation S202. Accordingly, the processes of receiving and demodulating the broadcast information illustrated in FIG. 1 are omitted, and thus, the initial access is simplified and access time is shortened. Therefore, an efficient communication is obtained.

In FIG. 2, it is exemplified that the supplementary information is obtained through the GPS communication modem. Such supplementary information may include not only the location and time information obtained using the GPS communication but also various kinds of supplementary information such as weather information, map data information, and communication system information. Also, the supplementary information may be reprocessed to be converted to second or third supplementary information. For instance, periodic location information obtained through a GPS receiving modem may be converted to information of a distance from another object or velocity and speed information of a GPS receiver. As another example, although the map data information itself is the supplementary information, the map data information may include other supplementary information. That is, the map data information may further include information on whether a certain location is in a downtown area where many buildings are located, a rural area with a wide-open view, a tunnel area, or a forest area.

Also, although three-dimensional map data is mainly used in the military presently, the three-dimensional map data may be more widely applied if the three-dimensional map data is commercialized. That is, in the case that the integrated terminal uses the three-dimensional map data and the location information, a user may find out whether he or she is positioned on the ground or in the basement or whether he or she is positioned outside or inside of a building through the integrated terminal. Such supplementary information may be directly inputted by a user or may be secured by a certain sensor included in the integrated terminal. Also, the supplementary information may be secured accessing another communication network.

Figure 4:
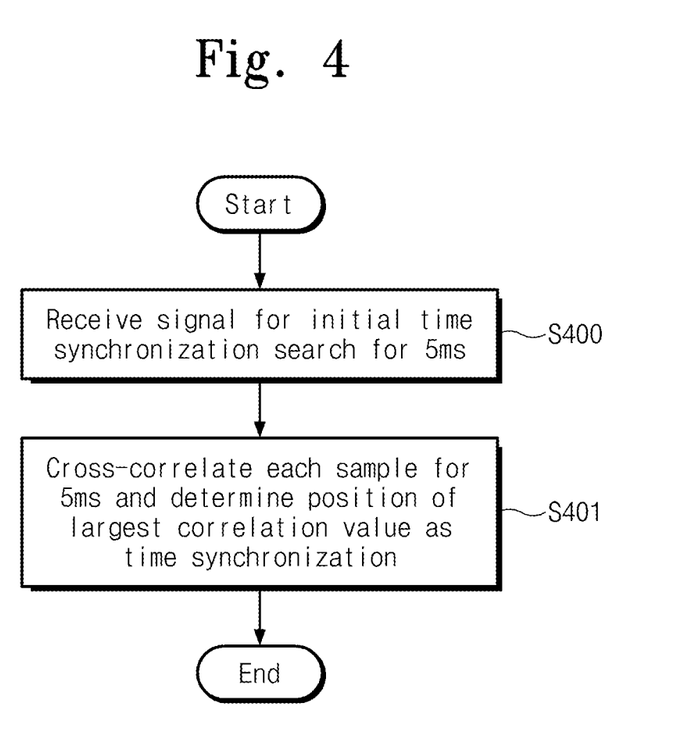
FIG. 4 is a flowchart illustrating a general process for a typical terminal to perform an initial time synchronization.

FIG. 4 is a flowchart illustrating a typical process of initial time synchronization performed by a general terminal. In operation S400, a signal for searching initial time synchronization is received for, e.g., about 5 ms. In operation S401, by cross-correlating each sample for about 5 ms, an initial synchronization time is determined based on a largest correlation value. According to the process of initial time synchronization illustrated in FIG. 4, it takes a relatively long time to determine the initial synchronization time.

FIG. 5 is a flowchart illustrating a process according to the embodiment of the present invention for improving the process of FIG. 4. Referring to FIG. 5, in the case of using a communication network information file generated by obtaining supplementary information, the time taken for the initial time synchronization is shortened. In operation S500, supplementary information related to a location and a time is obtained. In operation S501, at least one of a plurality of base stations is selected using the location information and the communication network information file. In operation S502, a window starting time is calculated and time synchronization is detected within the window time. Accordingly, it takes about 12.5 μs at most for time synchronization with a base station.

Figure 6:
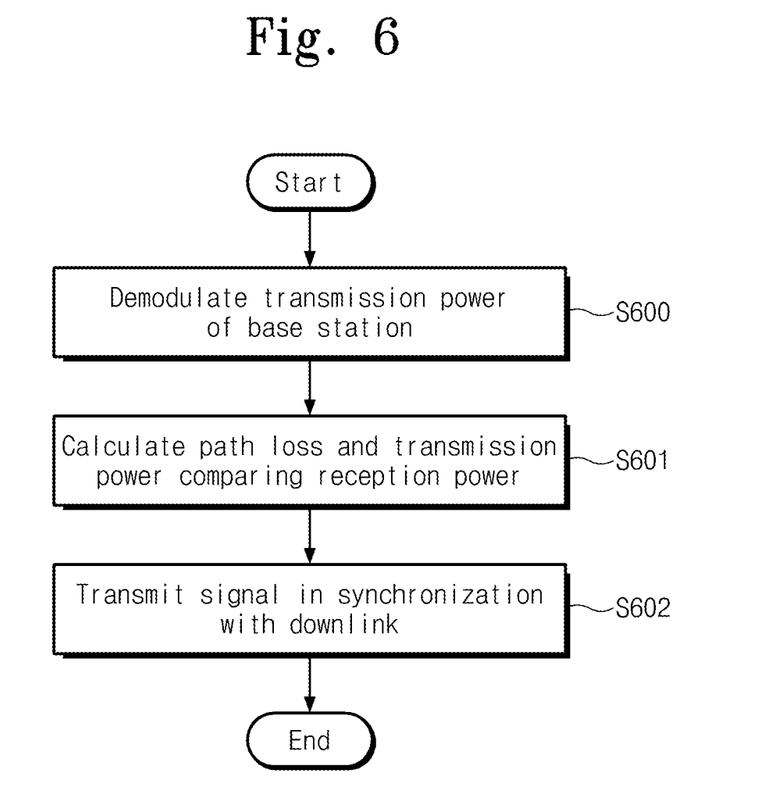
FIG. 6 is a flowchart illustrating a process for a typical terminal to transmit an initial access signal.

FIG. 6 is a flowchart illustrating a process of transmitting an initial access signal performed by a general terminal. Referring to FIG. 6, in operation S600, the terminal demodulates reference signal power information transmitted by a base station. In operation S601, the terminal compares the demodulated power information with actually received power information and calculates a path loss. Then, the terminal calculates an initial transmission power based on the path loss. In operation S602, the terminal transmits a signal with the calculated transmission power in synchronization with down link synchronization. The transmitting process of FIG. 6 is complicated; however, the transmitting process may be relatively simply performed using the communication network information file according to the present invention. That is, if the supplementary information in the communication network information file is used, the process of transferring the transmission power from a base station and the process of demodulating the transmission power performed by the terminal are omitted.

The communication network information file and a terminal information file of the embodiment of the present invention are included in the memory 140 of the integrated terminal. In view of development of communication technology, it is needed to include the files in a terminal.

The communication network information file may exist in each communication network. For instance, each individual communication network information file of the 3G network, the Wi-Fi network, and the like may be independently included in a terminal.

The communication network information file may include location information of base stations included in a country or a region. The communication network information file may even include all fixed information transmitted to all terminals through a broadcast channel by base stations.

Since most of integrated terminals include a large-capacity memory, the communication network information file having a small capacity of, e.g., less than about 1 Mbyte may be stored in the memory. The communication network information file may be automatically updated periodically. That is, the terminal may automatically update the communication network information file to a latest version during accessing a network. Also, when the terminal is moved to a foreign country, the terminal may previously download the communication network information file of that region manually. Or, the communication network information file of the whole world may be stored in the memory even though a file size is rather large. Or, in the case of inputting a region to which a user will travel, all the communication network information files related to the region may be downloaded.

The communication network information file may include many kinds of data. For instance, the communication network information file may include location information of a base station, time information of a base station, transmission power of a reference signal, base station ID, kind of an accessible communication, frequency band, the number of frequency bands, system version of a base station, kind of a base station, information of a region where a base station is included, average coverage of a base station, current state of a base station, paging group, the number of available antennas for transmitting and receiving, average number of accessing users, kind of an accessible terminal, information of a possessed repeater, and fixed information and a default value among information which should be transferred through a broadcast channel if there is no communication network information file.

The location information of a base station is data of latitude, longitude, and height. The time information of a base station is data of a reference time of the base station, whether the base station is synchronous or asynchronous, and an offset from the reference time. The base station ID may appropriately include each ID used in the OSI 7 layer. The kind of a base station indicates that the base station is a normal cell or a black cell (not accessible by a terminal). The information of a region where a base station is included may indicate whether the base station is located in a subway, a tunnel, a tall building, or a highway, or may be information of a country, a state, or a city where the base station is included. The kind of an accessible communication is information about an accessible communication method in the case that various kinds of communication methods are used in the base station. Although communication networks are not integrated presently, a single base station may support a plurality of communication specifications such as Wi-Fi, WiBro, 3G-LTE, and new specification in the near future. The repeater information shows the number of repeaters repeating signals of a main base station and location, power, and repeating delay time of each repeater. The current state of a base station may include a state of operation and a state of repair. The fixed information includes fixed values among information broadcasted from each communication network. The default value includes variable values among the information broadcasted from each communication network.

The terminal information file is also needed considering a complicated and multifunctional terminal. The terminal information file may include kind of a communication available for a terminal, maximum transmission power, terminal ID, frequency band, the number of frequency bands, system version of a terminal, kind of a terminal, terminal user information (nationality, age, and the like), the number of available antennas for transmitting and receiving, kind of an accessible communication network, kind of a service required to be provided from a communication network, resolution of a terminal LCD, format of a decodable video, and information of a peripheral device of a terminal such as camera, GPS receiver, and projector. Each communication network has basic information of a terminal because the communication network needs to determine whether to allow a terminal to access when the terminal tries access and also needs information related to the terminal. However, since a terminal may access various communication networks, it is inefficient that a single communication network knows all information of the terminal. Therefore, it is good to transfer the terminal information file after a terminal accesses a communication network. Each communication network extracts needed information from the terminal information file to use the needed information.

Hereinafter, a method for efficiently performing a communication operation will be described exemplifying a mobile communication system with reference to the accompanying drawings. For convenience, cases of a terminal (integrated terminal) and a base station will be separately described.

Above all, in the case of a terminal, a method for efficiently searching a signal using the supplementary information is firstly described. Presently, an initial signal search is performed through a very complicated process. For instance, the process of adjusting the initial time synchronization is performed in a general communication system as described above referring to FIG. 4. Firstly, a signal for initial search provided by each system is found. The signal for initial search is designed to be suitable for each communication system. However, mostly, the signal for initial search is periodically transmitted. For instance, a PSCH signal is transmitted every 5 ms according to the 3G-LTE specification. Generally, for searching the PSCH signal, each sample is cross-correlated continuously for 5 ms. If a sampling rate is about 0.96 Msps, 4800 times of cross-correlation should be performed for 5 ms. After the initial time synchronization is determined, the terminal receives and demodulates a different channel signal to obtain information of a base station. However, as illustrated in FIG. 5, in the case of using the supplementary information, the initial signal search may be simplified.

In the case of the above-described FIG. 5, the initial signal search is performed using the location supplementary information obtained through GPS signal reception and the communication network information file. Firstly, it is assumed that the location information has been obtained through a GPS modem and the ID and the location information of a local base station is known using the communication network information file. In this case, the integrated terminal may select nearest one or more base stations. Thereafter, the terminal calculates a signal propagation time from a base station to the terminal based on a distance to the nearest base station and a speed of an electromagnetic wave. Herein, the signal propagation time is calculated on a basis of a straight-line distance between the terminal and the base station. The propagation time is set as a starting time of a search time window. A section of the search time window may be appropriately configured to be suitable to characteristics of a system. In the search time window, the terminal tries to perform the initial signal search. Trying to perform the initial signal search in this manner has the following merits. Firstly, a probability of obtaining wrong time synchronization becomes very small. Secondly, implementation of hardware is easy. Thirdly, power consumption for calculation is reduced. This method is compared with the above-described example, i.e., 4800 times of cross-correlation for 5 ms. Using the proposed method according to the present invention, the terminal may know its location and the signal propagation time from a base station. Therefore, the time widow may be limited to, e.g., about 12 samples (about 12.5 μs). Accordingly, the cross-correlation is performed just about 12 times. In this case, the probability of obtaining wrong time synchronization is decreased by about 400 times. Also, the calculation power is also decreased by about 400 times. In an aspect of the hardware implementation, there is a large difference between storing 4800 samples and storing 12 samples. Since it requires a large capacity of memory to actually store 4800 samples, a real-time cross-correlator not-requiring a memory is used. Hardware of the real-time cross-correlator is very complicated.

The method of initial signal search illustrated in FIG. 5 may induce a new change of a specification because the specification is made considering actual implementation of hardware. For instance, a general communication system has two kinds of reference signals. One is a reference signal for the initial signal search and the other is a reference signal for a signal demodulation. Since the initial search process is complicated, the different kinds of different signals are needed. However, if the initial search method is simplified as described above, two kinds of signals are not needed. For instance, each base station of 3G-LTE has a synchronization channel signal (PSCH, SSCH) and a cell characteristics reference signal. The synchronization channel signal makes coarse time synchronization and cell ID obtained. The cell characteristics reference signal makes wireless channel information for demodulation obtained. Also, fine synchronization may be obtained by the cell characteristics reference signal. However, using the cell characteristics reference signal, the time synchronization and cell ID may also be obtained. That is, although this method is not impossible, it is very difficult to implement this method as actual hardware, and thus, it has no practicality. However, using the initial signal search method according to the present invention, it is easy to implement the initial signal search using the cell characteristics reference signal. That is, already-known one or more cell characteristics reference signals are detected within the time window section. In this way, it is not needed to detect and compare all the cell characteristics reference signals related to hundreds of cell IDs. About 4 to 5 cell characteristics at most are compared. Also, sine the comparison is performed within the search time window section, the implementation is very easy. Accordingly, the synchronization channel signal may be unnecessary. Of course, this is possible under assumption that the terminal knows its location and the location information of a base station. Under communication environments of a ship or a vehicle, the GPS signal may be received in most cases. However, under a cellular mobile communication environment, the GPS signal reception may not be easy. In this case, lastly-traced location information or supplementary information obtained from a communication network should be used. Also, it may be also considered that a current location is automatically or manually inputted based on a map data. Herein, the current location may be obtained by inputting a name of an adjacent famous building, a store name, an address of a currently located place, and a lastly-traced location. The location information obtained in this manner may be converted to GPS location information using the map data.

Secondly in the case of the terminal, when the terminal initially accesses a base station (situation that the base station does not control transmission time of the terminal), the terminal may efficiently determine transmission time information and initial transmission power using the supplementary information.

In a typical case, as described above referring to FIG. 6, the terminal demodulates the reference signal power information transferred from the base station and compares it with the actual reception power to calculate the path loss. And, since the initial transmission power is determined based on the calculated path loss, time for determination is relatively long and the determined power may be incorrect. Also, since the distance between the terminal and the base station is not known, the base station uses a huge search time window for detecting the initially transmitted access signal.

However, according to the embodiment of the present invention, the path loss may be directly calculated using the transmission power information of each base station stored in the communication network information file and the actual reception power information. In the case of using the supplementary information included in the communication network information file like this, the process of transferring the transmission power from the base station and the process of demodulating the transmission power performed by the terminal are omitted. Also, since the terminal may know the distance between the terminal and the base station through the supplementary information, the terminal may calculate the signal propagation time based on the straight-line distance between the terminal and the base station. Therefore, when a signal is transferred, if the signal is transferred as much as the calculated time in advance, the signal is transferred in synchronization with the time set by the base station. Therefore, the base station may detect the initial access signal of the terminal even having a relatively very short search time window. Generally, if a short search time window is used, it is known that the detection of a signal becomes more accurate, hardware of the base station for the signal search becomes simplified, and the power consumption is reduced. Also, in this case, since more search windows may be made within a unit time, an access reception capacity of an uplink is increased.

Thirdly in the case of the terminal, the terminal may efficiently reduce information needed during a handover using the supplementary information. In the case of a typical method, for the handover, the terminal should receive information of a handover-targeted base station from a currently accessed base station. However, according to the embodiment of the present invention, if the supplementary information provided from the communication network information file is used, the information amount needed for the handover may be minimized. Firstly, since the fixed information is basically included in the communication network information file, the base station does not need to additionally provide information. Also, variable information may be divided into a default value and an error value and the default value may be included in the communication network information file. In this way, since the base station just needs to provide the error value of the variable information and small amount of remaining information during the handover, amount of data to be transferred is greatly reduced. Also, in the case that the terminal initially transfers an access signal to the handover-targeted base station performing the handover, the initial access method using the supplementary information according to the present invention may be used. Therefore, the terminal may more efficiently determine the signal power and the transmission time.

Fourthly in the case of the terminal, in the case of using the supplementary information, a handover determination may be more efficient. Since a ping-pong phenomenon occurs during the handover, the terminal determines the handover only when a signal power of another base station is much higher than that of a currently accessed base station according to a typical method. However, considering a moving car, this method is not efficient because the power of the currently accessed base station is monotonously decreased and the power of the handover-targeted base station is monotonously increased while the car is moving at a middle point between the two base stations. Accordingly, the terminal may generate speed information from the GPS location information and may use this information to advance the handover time.

Figure 7:
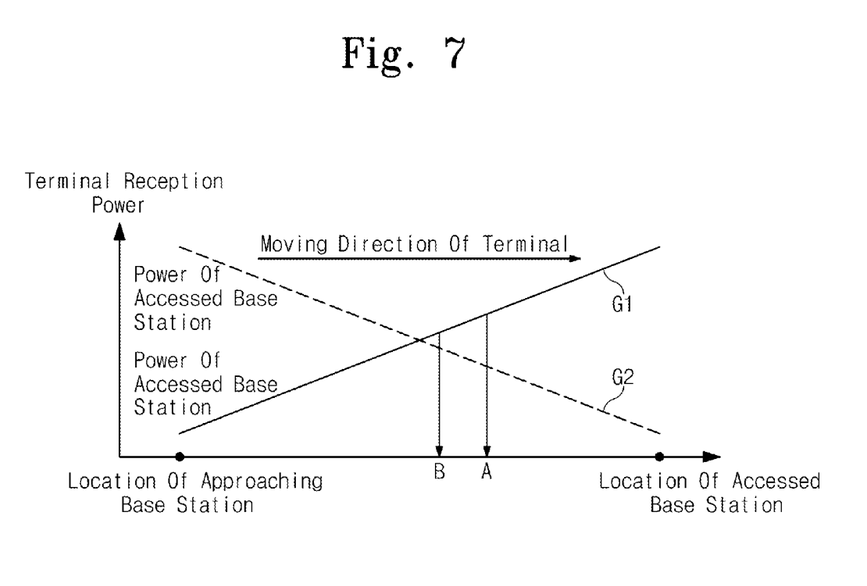
FIG. 7 is a graph contradistinctively illustrating a change of reception power according to movement of a terminal.

Referring to FIG. 7 contradistinctively illustrating a change of the reception power according to movement of the terminal, a difference of handover time between the typical handover and the proposed handover is distinctively shown. In the drawing, a horizontal axis denotes a location of a base station and a vertical axis denotes the reception power. A graph G1 shows that the reception power of the terminal is increased as the terminal is close to a base station to be accessed. A graph G2 shows that the reception power of the terminal is decreased as the terminal is far from the accessed base station. Accordingly, in this case, the handover is performed at a point A according to the typical handover method. However, according to the embodiment of the present invention, the handover is performed at a point B because the terminal knows the information of moving direction, speed, velocity, and the like as the supplementary information. Even though the terminal rapidly becomes far from the accessed base station, if the terminal rapidly becomes close to the handover-targeted base station, the ping-pong phenomenon rarely occurs, and thus, the handover time may be advanced. Therefore, since both the terminal and the base station receive a desired signal with higher power and receive an interfering signal with lower power, communication quality of a communication system may be improved and an implementation cost of a system may be decreased.

Fifthly in the case of the terminal, the terminal may stop the access try or may automatically try to access using the supplementary information. For instance, in the case of ocean communication, the terminal installed in a ship may determine whether there is a base station within a communicable distance using the location information of the ship and the communication network information file and may give up the access try, automatically access, or display an access possibility. This method may be very efficient in comparison with trying the communication by a man after watching the location information through the GPS or seeing a harbor with the naked eye. Also, if the supplementary information is used even in the case of the mobile communication, the initial synchronization obtainment is not needed to be tried outside of a communicable area. In the case of not continuously trying for the initial synchronization obtainment, battery consumption may be remarkably reduced.

Sixthly in the case of the terminal, the terminal may efficiently compensate a frequency offset using the supplementary information such as a speed. In the case of the typical terminal, it is very difficult to correctly calculate a Doppler frequency. However, in the case of recent and future integrated terminals, the speed information for a base station may be easily obtained from the location information gained from the GPS or the like. Using this speed information, the speed of terminal becoming close to the base station or becoming far from the base station may be calculated. From this speed, a Doppler frequency offset may be easily calculated. The calculated value of the Doppler frequency may be very easily used when an uplink and a downlink use a different frequency band. For instance, it is assumed that the terminal becomes far from the base station at a speed of about 10 m/s and the Doppler frequency is about 50 Hz. In this case, the terminal detects a frequency which is smaller than an original frequency as much as about 50 Hz in the downlink and adjusts an oscillator of the terminal as much as −50 Hz. However, since the uplink frequency is mostly interoperated with the downlink frequency and exists in a similar frequency band, a signal is transmitted to the base station with a frequency changed as much as about −50 Hz. Since the terminal still moves when the uplink is transmitted, the base station detects the Doppler frequency of about −100 Hz. If the uplink frequency is not interoperated with the downlink frequency, the Doppler frequency of about −50 Hz is detected. In this case, the terminal receiving the downlink signal may eliminate the frequency offset of about −50 Hz adjusting the oscillator of the terminal. However, it is difficult for the base station receiving the uplink signal to eliminate the frequency offset of about −100 Hz or −50 Hz. Accordingly, an error ratio of the uplink signal is large due to the frequency offset. Also, a method for correctly estimating the Doppler frequency offset of the terminal has not been substantially developed until now. Therefore, the frequency offset due to the Doppler phenomenon has not been eliminated in the uplink. However, in the case of using the supplementary information of speed according to the present invention, the speed of terminal becoming close to the base station or becoming far from the base station may be calculated, and the Doppler frequency offset may be calculated from the speed. Using the calculated downlink Doppler frequency, the Doppler frequency of the uplink may be calculated. Therefore, when the terminal transmits the uplink signal, if the frequency is previously moved as much as the uplink Doppler offset value, the frequency offset of the uplink may be efficiently compensated.

Seventhly in the case of the terminal, the terminal may efficiently adjust an AGC update rate using the supplementary information. The terminal may make the AGC update rate faster or slower using the location information obtained from the GPS and current region information obtained from the communication network information file or the map data. In detail, since the terminal may extract speed information from the continuously obtained location information, the terminal increases the AGC update rate if the speed is high and decreases the AGC update rate if the speed is low. Also, using the current region information, the terminal may increase the AGC update rate because fading is serious if the current region is an urban area. If the current region is a rural area, the terminal may decrease the AGC update rate because fading is not serious. Herein, the speed information may be extracted from the GPS location information, or the terminal itself may calculate the speed information measuring a change of the time synchronization of the terminal.

Hereinafter, a method of using the supplementary information in a base station will be described according to the embodiment of the present invention.

Above all, in the case of the base station, the location information of a terminal may be received periodically or aperiodically. Using this location information, a distribution state of accessing terminals and a moving speed of each terminal may be obtained in the base station. The base station may apply such supplementary information and the obtained information for various operations such as beamforming, data scheduling, and handover. Also, besides the location information, needed terminal information, i.e., the terminal information file, may be received from the terminal or an adjacent base station.

Firstly in the case of the base station, the beamforming may be performed using the terminal distribution information as the supplementary information. That is, each terminal transmits location supplementary information obtained by each terminal to the base station, and the base station may generate the terminal distribution state using the received terminal locations. Therefore, using the generated terminal distribution information, the base station may generate many beams for each distribution region to transmit a signal.

Secondly in the case of the terminal, using the distance between the terminal and the base station and the speed of the terminal, amount of resources suitable for each terminal and kinds of resources to be used may be determined. That is, the data scheduling may be efficiently performed. In detail, if more resources are allotted to the terminal closer to the base station, a system capacity is increased on the whole because the terminal closer to the base station has a higher Signal to Interference Ratio (SIR) and a data error ratio is small in a high SIR. Therefore, if many data have small error ratios, the whole system capacity is increased. Also, more resources may be allotted to a slower terminal because a Signal to Noise Ratio (SNR) is increased if the speed is low and the data error ratio is decreased if the SNR is increased. Also, when a base station A provides some resources to a terminal 'a' close to the terminal A, a base station B may provide the same resources to a terminal 'b' located closely to the base station B. In the case of allotting the same resources in this manner, since the terminals 'a' and 'b' receive much stronger signals from their respective base stations than signals from other base stations, the terminals 'a' and 'b' are rarely influenced by the effect due to collision of the overlapping allotted resources. Therefore, resources of a communication are efficiently used. In the case of a terminal which is far from each base station, it is highly possible for the terminal to receive a signal of another base station. Therefore, it is good to allot resources without overlapping. Then, an interfering signal received to each terminal is reduced. For more efficient resource allotment, the base station may previously analyze the map data around the base station to previously know an approximate channel at each location. Of course, the channel is changed according to a frequency, weather, or movement of a moving object. However, since large buildings greatly affect the channel, the previous knowledge of the rough channel information by the base station may be greatly helpful to the data scheduling. That is, if an approximate SNR or SIR at the location is known, an appropriate resource allotment may be performed.

Thirdly in the case of the base station, the handover may be efficiently performed. The base station may predict the handover by obtaining location and velocity information of an accessing terminal because the distance between the terminal and the base station is larger than a set critical value and the velocity is in a direction away from the base station when the handover is performed.

Therefore, if the handover is predicted, the base station may transfer the terminal information needed for the handover to a selected another base station. In this way, since the selected base station may perform a preparing operation according to the handover, the selected base station may quickly response to a handover request. This method may be useful for terminals which continuously perform the handover such as terminals running in a highway.

As described above, appropriately using the supplementary information, the communication system may be very efficiently operated and operations which are still impossible and difficult may be performed.

The method of the present invention may be stored into a recording medium such as CD ROM, RAM, ROM, floppy disk, hard disk, and magneto-optical disk as a computer-readable program. Since this process is easily performed by those skilled in the art, detailed explanations are omitted.

According to the embodiment of the present invention, the communication operation can be efficiently performed using the supplementary information. Therefore, various and wide communication services can be optimally provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for performing a communication operation in a wireless communication terminal, comprising:
   reading a communication network information file including information related to performing the communication operation, wherein the communication network information file is updated and is included in the wireless communication terminal; and
   performing the communication operation using the read communication network information file, wherein, during an initial signal search for the communication operation, the wireless communication terminal performs:
   obtaining location information of the wireless communication terminal;
   selecting at least one nearest base station from the obtained location information using base station location information included in the communication network information file;
   calculating a signal propagation time using a straight-line distance from one of the selected nearest base stations and a speed of an electromagnetic wave;
   setting the calculated signal propagation time as a starting time of an initial signal search time window; and
   performing the initial signal search within the initial signal search time window.

2. The method of claim 1, wherein the communication network information file comprises at least one data from location information of a base station, time information of the base station, transmission power of a reference signal, base station ID, kind of an accessible communication, frequency band, the number of frequency bands, system version of the base station, kind of the base station, information of a region where the base station is included, average coverage of the base station, current state of the base station, paging group, the number of available antennas for transmitting and receiving, average number of accessing users, kind of an accessible terminal, and a possessed repeater.

3. The method of claim 1, wherein the update of the communication network information file comprises: providing version information of the communication network information file included in the wireless communication terminal to a base station; and receiving a latest version of the communication network information file and updating the file when it is confirmed that the communication network information file is not the latest version in the base station.

4. The method of claim 1, wherein additional inclusion and update of the communication network information file comprises downloading a communication network information file of a selected region through a communication network to which the wireless communication network is currently accessing in response to a region selection request of a user.

5. The method of claim 1, wherein a reference signal used for a signal demodulation is used for the performing the initial signal search.

6. The method of claim 1, wherein the wireless communication terminal measures a reception power of a base station signal and calculates a path loss using the reception power and a base station transmission power included in the communication network information file for calculating the path loss of a downlink signal.

7. The method of claim 1, wherein, in the case that the wireless communication terminal transmits an initial access signal to a base station for an initial access to the base station, the wireless communication terminal performs: obtaining location information of the wireless communication terminal; calculating a straight-line distance between the location of the wireless communication terminal and a base station desired to be accessed using an obtained location supplementary information and base station location information included in the communication network information file; calculating a signal propagation time from the terminal to the base station using the straight-line distance to the base station and a speed of an electromagnetic wave; and transmitting the initial access signal as much as the calculated signal propagation time in advance to be synchronized with an access reception time set by the base station.

8. The method of claim 1, wherein, when a handover time is determined, the wireless communication terminal performs: detecting a signal power of an accessed base station and a signal power of a handover-targeted base station; comparing the detected powers; and
performing the handover more rapidly when the signal power of the handover-targeted base station is larger than that of the accessed base station and the wireless communication terminal moves.

9. The method of claim 1, wherein, when the wireless communication terminal accesses a communication network, the wireless communication terminal performs: obtaining location information of the wireless communication terminal; searching a base station communicable from the obtained location; and not performing an initial signal search and an initial access try when it is determined that there is no communicable base station based on the searching.

10. The method of claim 1, wherein, when a Doppler frequency offset is calculated, the wireless communication terminal performs: obtaining location information and speed information of the wireless communication terminal; calculating a speed of the wireless communication terminal becoming close to a base station or becoming far from the base station using the obtained location information and speed information and base station location information included in the communication network information file; and calculating the Doppler frequency offset based on the calculated speed.

11. The method of claim 10, wherein, when a transmission frequency is transmitted, the wireless communication terminal performs: converting the calculated Doppler frequency offset of a downlink to a Doppler frequency offset experienced by a base station in an uplink; and previously compensating an uplink transmission frequency as much as the converted offset value for transmission.

12. A method for performing a communication operation in an integrated terminal comprising a plurality of communication modems, the method comprising:
obtaining supplementary information from a communication network to which the integrated terminal is accessing; and
performing the communication operation with another communication network using the obtained supplementary information, wherein, during an initial signal search for the communication operation, the integrated terminal performs:
obtaining location information of he integrated terminal;
selecting at least one nearest base station from the obtained location information using base station location information included in the supplementary information;
calculating a signal propagation time using a straight-line distance from one of the selected nearest base stations and a speed of an electromagnetic wave;
setting the calculated signal propagation time as a starting time of an initial signal search time window; and
performing the initial signal search within the initial signal search time window.

13. A wireless communication terminal, comprising:
a plurality of modems configured to perform a communication operation corresponding to base stations of various communication systems;
a storage unit configured to store a communication network information file which is self-contained and updated; and
a control unit configured to perform the communication operation reading the communication network information file of the storage unit, wherein, during an initial signal search for the communication operation, the wireless communication terminal:
obtains location information of the wireless communication terminal;
selects at least one nearest base station from the obtained location information using base station location information included in the communication network information file;
calculates a signal propagation time using a straight-line distance from one of selected nearest base stations and a speed of an electromagnetic wave;
sets the calculated signal propagation time as a starting time of an initial signal search time window; and
performs the initial signal search within the initial signal search time window.

* * * * *